US United States Patent Office 2,974,189
Patented Mar. 7, 1961

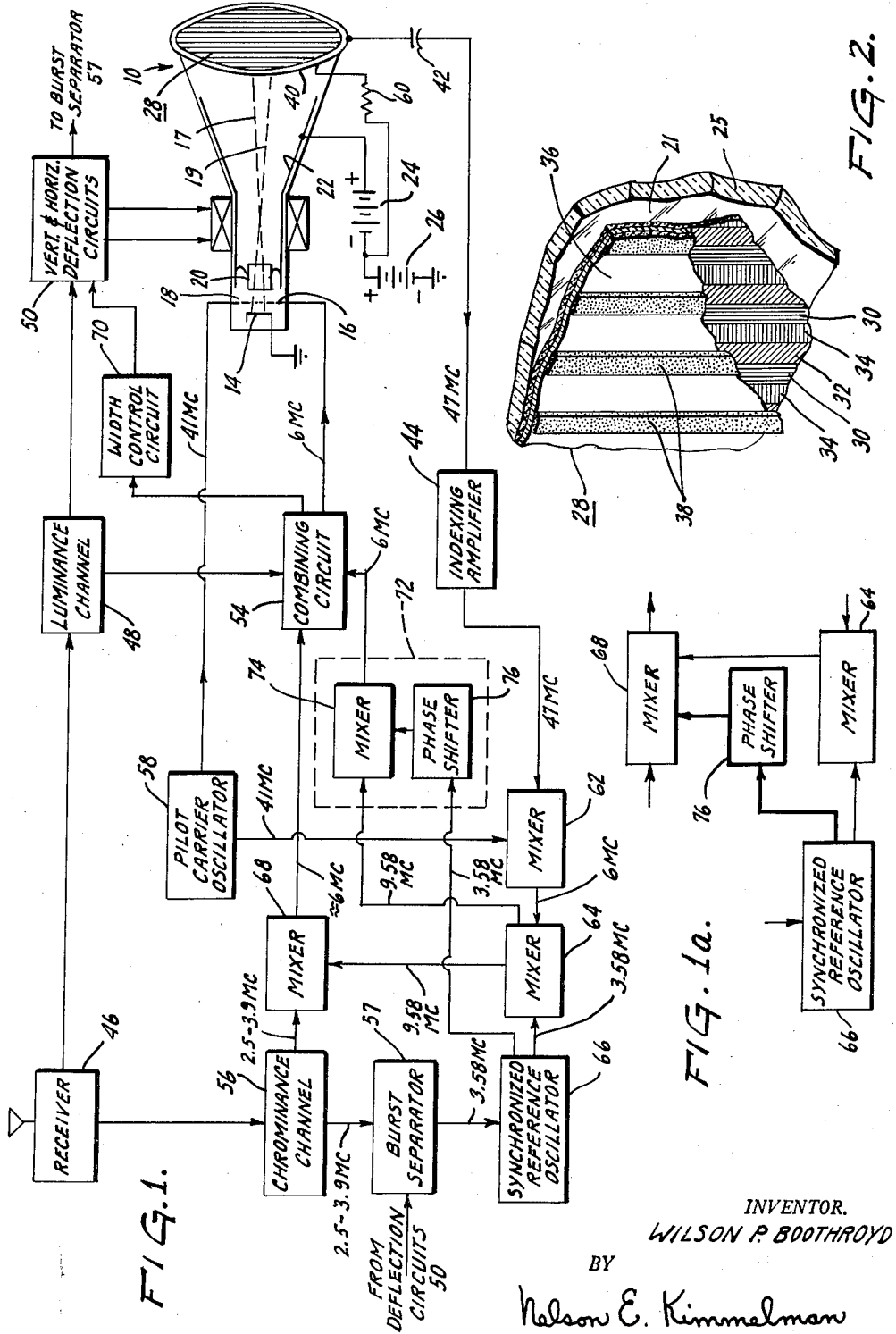

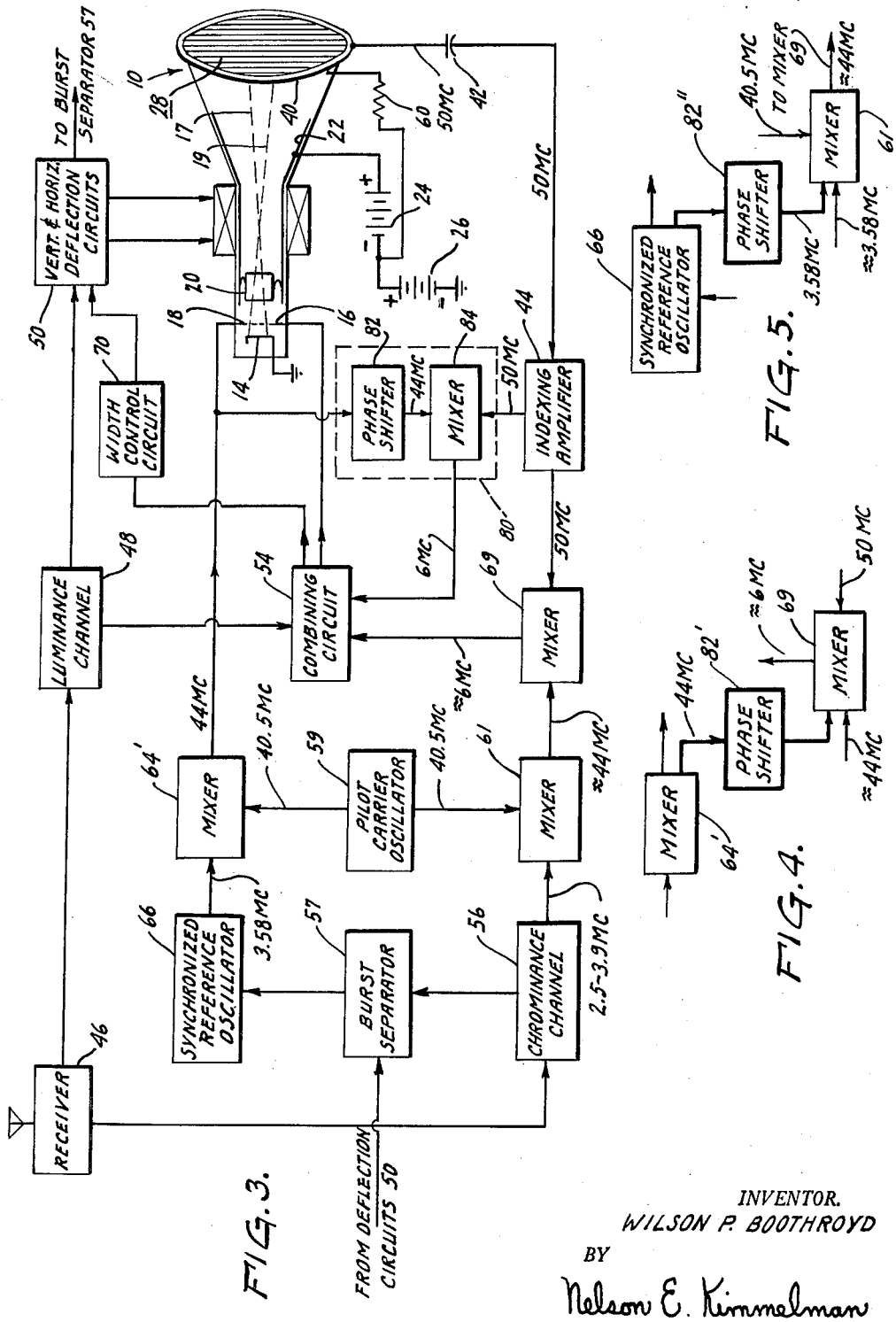

2,974,189

BEAM INDEXING SYSTEM HAVING AUTOMATIC WIDTH CONTROL DURING COLOR RECEPTION

Wilson P. Boothroyd, Huntingdon Valley, Pa., assignor to Philco Corporation, Philadelphia, Pa., a corporation of Pennsylvania Filed Jan. 18, 1960, Ser. No. 3,007

28 Claims. (Cl. 178—5.4)

This invention relates to cathode ray tube systems and in particular to such systems used for the reproduction of images televised in color.

The invention is particularly adapted for and will be described in connection with a color television image presentation system utilizing a single cathode ray tube having a beam-intercepting structure which comprises an image-forming portion and an indexing portion. The image-forming portion comprises a number of sets of strips of luminescent material, each of which sets fluoresces in a different color when impinged upon by electrons. These strips are usually arranged in laterally-displaced color triplets, each triplet comprising one green, one blue, and one red-emissive strip arranged adjacent to one another. The strips are arrayed with their axes substantially transverse to the direction in which the cathode ray beam is deflected by appropriate deflection means. As the beam is deflected over successive ones of the phosphor strips in scanning each line of the reproduced image its instantaneous intensity ideally should correspond to the intensity of the color of the element of the televised scene which is being scanned. It should also be modulated by a signal representative of the color emitted by the phosphor strip on which it is then impinging. In practice since the rate at which the beam scans across the phosphor strips may vary because of non-linearities in the speed of deflection of the beam, or because the spacing between phosphor strips may vary, it is highly desirable to coordinate the modulation of the beam with its instantaneous scanning position.

Previously such coordination has been obtained by disposing on the beam-intercepting structure indexing elements indicative of the instantaneous position of the beam. These indexing elements often took the form of a plurality of strips which were arranged on the beam-intercepting structure parallel to the phosphor strips and disposed so as to have a predetermined spatial relation to particular ones of the color-emissive strips in the image-forming portion. The indexing strips could consist either of a material which had a secondary-electron emissive property which differed from the secondary-electron emissive property of the rest of the beam-intercepting structure on which they were disposed, or could consist of a fluorescent material which had a spectral output in a region which could be detected and converted into an electrical signal. An indexing signal amplifier was usually provided which amplified the indexing signal to the desired amplitude level. This amplified electrical signal could be used either to shift the position of the beam to correspond to the modulation thereof, or to vary the modulation of the beam to correspond with the instantaneous position thereof.

It was also found desirable in such display systems to provide a control circuit for maintaining the width of the picture constant, for otherwise the width of the picture varied over the long term due to aging of the circuit components, changes in the line voltage, or to other factors. Some forms of width control circuits that were used were made responsive to the indexing signal derived from the indexing portion of the beam-intercepting structure. The indexing signal for actuating these forms of width control circuits was usually amplified in separate amplifiers to bring the amplitude of the indexing signal up to the level required for functioning of the width control circuit. To simplify the construction of color television receivers and to reduce their costs, ways were sought to dispense with these separate indexing signal amplifiers. It was noted that in certain types of display systems of the type described, the video or "writing" beam was modulated in circuits which heterodyned the indexing signal both with the chrominance components of the received color television signals and with a wave having a reference phase, i.e., a wave at 3.58 mc. which had the same phase as "burst." These mixing circuits inherently amplified the indexing signal to levels enabling it to be used to actuate the width control circuit. However, these signal-processing circuits were so constructed as to be inoperative if the incoming signal did not contain any chrominance components, i.e., when the incoming composite color signal had no sub-carrier components except the burst. This would be the situation if, during a program televised in color, black and white film was televised. In such a case no indexing signal component would be supplied to the width control circuit and the width of the picture would suddenly change thereby causing an unpleasant visual sensation of shrinkage or enlargement to be experienced by the viewer.

It is therefore an object of the invention to provide in cathode ray tube systems of the type described a system for insuring that a circuit actuated in response to the indexing signal continues to operate whenever the received signals are color television signals.

A further object of the invention is to provide in a cathode ray tube system of the type described a means for insuring that the width control circuit continues to be supplied with an indexing signal component whenever the received signals contain a burst of a synchronizing oscillatory wave.

Still another object of the invention is to provide in cathode ray tube systems of the type described apparatus for preventing abrupt changes in the width of the reproduced image in transitions from color to monochrome portions, or vice versa, of programs which have been televised in color.

These objects, as well as others which will appear, are achieved according to my invention by providing apparatus which insures that a signal component corresponding to the indexing signal and which has an amplitude level sufficiently high to actuate a width control circuit, is made available to the latter circuit whenever color television signals are received. I accomplish this in systems wherein the width control circuit is coupled to a video beam modulation circuit preferably by providing that the output signal of the latter circuit contains an indexing component at a relatively high amplitude level whenever the received signals contain a burst of the color subcarrier. To this end, I provide means for supplying an auxiliary signal at the writing frequency and which contains indexing components to the video beam modulation circuit whenever signals containing burst are received. Since the use of this auxiliary signal to modulate the video beam would cause color errors in a colored image reproduced on a screen structure that has been conventionally "white-balanced" and would produce color-tinged black-and-white images when the incoming signals corresponded to monochrome portions of a color television program, I further provide that the image-forming fluorescent portion of the screen is not conventionally "white-balanced." Instead it is balanced to a predetermined "off-white" color that is to say, its "whites" are colorimetrically slightly different from the "whites" adopted as standard for U.S. color television broadcasts. Thus this non-standard "off-white" color operates complementarily to the action of the auxiliary signal, to produce correct images for color television signal reception. By so doing, when the incoming signals contain chrominance components, the addition of the auxiliary signal is compensated for by the off-white color balance of the screen thereby enabling the colors of a televised scene to be reproduced faithfully. When the incoming color television signals represent monochrome scenes, the off-white color balance of the screen compensates for the addition of the auxiliary signal thus enabling untinged black-and-white images to be reproduced. The invention will be described in greater detail with reference to the appended drawings forming part of the specification and in which:

Figure 1 is a block diagram, partly schematic showing one form of a cathode ray tube system in accordance with the invention;

Figure 1a is a block diagram of another form of the invention that may be substituted in the overall system shown in Fig. 1;

Figure 2 is a sectional and perspective view of the beam-intercepting structure of the cathode ray tube shown in Fig. 1;

Figure 3 is a block diagram, partly schematic of another form of a cathode ray tube system in accordance with the invention; and Figures 4 and 5 are portions of block diagrams of complete systems showing other forms of the invention.

Referring to Figure 1, a cathode ray tube system is shown therein which comprises a receiver 46 having conventional RF and IF stages which supplies, in response to received color television signals, an output IF signal to the luminance channel 48. The luminance channel 48 includes an amplitude detector which extracts the luminance information chiefly contained in the lower 3.25 megacycle-wide portion of the composite color video signal. The luminance channel 48 also contains apparatus for extracting the deflection timing signals contained in the incoming signal which are then applied to synchronize the operation of the vertical and horizontal deflection circuits 50. The circuits 50 deflect the video and indexing beams 17 and 19 in unison over the beam-intercepting structure 28 of cathode ray tube 10 in a regular pattern of spaced horizontal paths to form a conventional raster. The luminance channel 48 also supplies the luminance signal to a conventional combining circuit 54 which supplies a signal to the control electrode 16 for modulating beam 17 (hereinafter termed the "video" beam). A fuller explanation of the function and operation of circuit 54 will be given below.

The receiver 46 also supplies an intermediate frequency signal containing the color representative components to the chrominance channel 56 which contains a conventional chrominance signal detector and is tuned to pass frequencies in the approximate frequency range 2.5 mc.–3.9 mc. These chrominance components comprise a subcarrier at 3.58 mc. which is modulated in amplitude and phase to correspond to the saturation and hue respectively of the element being scanned at the transmitter.

The cathode ray tube 10 contains within an evacuated envelope a beam-generating and accelerating electrode system comprising a cathode 14, a control grid 16 which controls the intensity of the beam 17 (hereinafter termed the "video" beam) which produces the pictorial information on the faceplate 25 of the tube 10, a control grid 18 which modulates a very low current "indexing" beam 19 (which is vertically aligned with and very close to the video beam 17), a focussing electrode 20, and a beam-accelerating electrode 22. The electrode 22 consists of a conductive coating on the inner wall of the envelope of the tube 10 which terminates at a point spaced from the faceplate of the tube. The coating 22 is maintained at a high positive potential of about +30 kv. by connections to the battery 24 and to the battery 26.

A beam-intercepting structure 28 is disposed on the faceplate 25 of the tube 10 as shown in greater detail in Figure 2. It includes an image-forming portion containing a plurality of phosphor strips 30, 32 and 34 which respectively are emissive of red, green and blue light in response to the impingement of the video beam 17 thereupon and which are disposed in contact with the faceplate 25.

In accordance with one feature of the invention, the image-forming portion of the structure 28 is not "white-balanced" to the standard "white," as are conventional cathode ray tubes used for color television. In conventional tubes, when the image-forming portion is scanned by a constant intensity beam, white having a color temperature of 7000° K., the temperature of Illuminant "C" as defined by the C.I.E. (7000° K.), is produced. According to my invention, however, the phosphor strips 30, 32 and 34 are constructed, by varying their efficiency or otherwise modifying their characteristics, to produce an off-white raster as, for example, one tinged with a barely perceptible trace of blue, i.e., white having a color temperature of about 8500° K., when scanned by a constant intensity beam. It will be shown hereinafter how this non-standard white-balance characteristic of the screen enables both colored and monochrome portions of color signal transmissions to be reproduced with fidelity.

On the rear surface of the phosphor strips an electron-permeable and conductive layer 36 is disposed which prevents contamination of the phosphor strips 30, 32 and 34 by screening them from the harmful effects of negative ions which may otherwise be impelled into contact therewith. The layer 36, which is at a potential somewhat less positive than the coating 22, i.e., about +25 kv., also helps to increase the brightness of the image produced on the faceplate by reflecting toward the viewer light which would ordinarily be lost toward the rear of the phosphor strips. On the back surface of the layer 36 a plurality of indexing elements 38 are so disposed that each one is opposite one of the green emissive strips 32, although it is to be understood that many other variations of arrangement are also possible. These indexing strips may be composed either of a material which emits light within a certain range of the electromagnetic spectrum, or may be composed of a material which has a secondary emissivity different from the secondary emissivity of the portions of the beam-intercepting structure on which it is disposed. The strips 38 emit electrons, when impinged upon by an electron beam, which are attracted toward the coating 22 by the higher positive potential (30 kv.) on the latter. This causes the aluminum layer 36 and the indexing strips 38 to become more positive. The charge on conductive ring 40 which is placed around the rim of the faceplate 25 and which is separated from the layer 36 by the dielectric glass of the tube envelope will therefore vary in accordance with the variations in the charge of the layer 36 thereby producing a displacement current in the ring 40 which is transferred via the coupling capacitor 42 to the indexing signal amplifier 44.

In order to produce an image on the beam-intercepting structure the beam 17 must be modulated by specially processed signals. In the system of Fig. 1, one method of processing of the color representative signals is accomplished by mixing the indexing signals from amplifier 44 both with an oscillatory wave at the color subcarrier frequency which has the phase of the incoming burst, and with the received chrominance components as will now be explained.

In the form of the invention shown in Figure 1, the indexing beam 19 is modulated in intensity at 41 mc., a frequency chosen because it is well above the frequency range of the video signals so that the separation of the indexing signals from the video signals is facilitated. The 41 mc. modulating signal is applied from the pilot carrier oscillator 58 to the control electrode 18. Consequently when the beam 19 is scanned across the indexing elements 38 a signal will be produced across the coupling capacitor 42 which has a frequency of 47 mc., i.e., the sum of the pilot carrier frequency and the frequency of the signal (6 mc.) produced by scanning the indexing elements 38. The 47 megacycle indexing signal is amplified by the indexing amplifier 44 which is tuned to 47 mc. and then applied to a conventional mixer 62. The pilot carrier from the oscillator 58 is also applied to the mixer 62 which heterodynes the two signals applied to it and derives therefrom a difference signal at 6 mc. containing phase variations depending upon variations in the speed at which the indexing elements of the structure 28 is scanned and/or upon variations in the spacing of the indexing elements. This 6 megacycle signal is then applied to a second mixer 64 to which a reference oscillatory wave at 3.58 mc. and having a reference phase is supplied from the synchronized reference oscillator 66. The oscillator 66 is synchronized by the periodic injection of the burst of the color synchronizing oscillatory wave appearing on the back porch of the horizontal blanking pulse in the received composite color video signal. This burst is separated from the horizontal blanking pulse by the application to the burst separator 57 of a pulse derived from the horizontal section of the deflection circuit 50 during the back porch interval. The mixer 64 produces an output signal having a sum frequency of 9.58 mc. and a phase dependent upon the phase of the reference oscillatory wave and upon the variations in phase of the indexing signals. This output signal is then mixed in another conventional mixer 68 with the chrominance components appearing in the output of the chrominance channel 56. The chrominance components have frequencies in the approximate range 2.5–3.8 mc., and phase variations corresponding to the color of the element being scanned at the transmitter. After heterodyning these two signals together the mixer 68 produces an output signal having difference frequencies centered about a frequency of 6 mc. and phase variations dependent upon the phase of the indexing signals, the reference oscillatory wave, and the chrominance components. This ≈6 mc. signal is applied to the conventional combining circuit 54 which thereupon combines it with the luminance component from channel 48 and supplies it to the control electrode 16 for modulating the video beam 17, this modulation being effectively coordinated with the position of the latter.

As has been stated above, it is desirable to provide a circuit for controlling the width of the picture produced on the faceplate of the tube 10. This may be done by providing a width control circuit 70 which is responsive to the indexing signal components of the signals applied to the combining circuit 54. In response to these components the width control circuit produces a signal which, when applied to the horizontal section of the deflection circuit 50, assists in maintaining the width of the picture constant over relatively long periods of time. The width control circuit 70 may take any of a number of forms. It may, for example, comprise a conventional phase discriminator having a center frequency of 6 mc. The discriminator will therefore produce an output D.C. signal whose amplitude and polarity indicate the extent and direction of the deviation of the indexing signal component from its "normal" frequency, i.e., 6 mc. This error signal may be applied to control the transconductance of the horizontal sawtooth amplifier tube thereby to vary the slope of the sawtooth wave thus controlling the width of the raster. One such arrangement is shown in U.S. Patent 2,385,563.

It may be seen that indexing information will not be available to the control circuit 70 if the composite color video signal being received represents only monochrome scenes for a length of time greater than the duration of several frames since the composite color video signal in such cases will not contain any chrominance components and thus the mixer 68 will provide no output signal which could be applied to the combining circuit 54. In the event that this happens the width of the picture on tube 10 may suddenly change until such time as the incoming signals are again representative of colored objects whereupon chrominance components will again be applied to mixer 68 and the indexing signal component can again be routed from mixer 64 via mixer 68 to the combining circuit 54.

There is therefore provided according to one form of the present invention, apparatus shown in dashed line rectangle 72 for insuring that (1) so long as signals corresponding to color television programs are received the width control circuit 70 will continue to be operative and also for insuring that (2) colored or monochrome portions of such programs are reproduced faithfully. Whenever the incoming signal contains burst this apparatus comprising the phase shifter 76 applies an auxiliary signal at the subcarrier frequency, and having a predetermined phase as will be explained below, to the mixer 74. The latter therefore can supply an auxiliary signal at about 6 mc. (writing frequency) containing indexing information to the combining circuit 54 even in the absence of any input to circuit 54 from mixer 68. Hence width control circuit 70 can respond to the indexing information in the auxiliary signal so long as burst is present in the incoming signal. When the incoming signals represent monochrome portions of color television programs the auxiliary signal from the mixer 74 will combine with the luminance signal from channel 48 to produce a combined modulating signal for which the off-white balance characteristics of the screen 28 compensates so that the latter can produce untinged black and white images.

Since the auxiliary signal is at the color subcarrier frequency it ordinarily would, when added to the regular modulating signal supplied to the combining circuit 54 from the mixer 74, causes images corresponding to colored and monochrome scenes televised in color to be tinged somewhat. It is therefore necessary to provide that the phase of the auxiliary signal and the off-white balance characteristic of the beam-intercepting structure 28 have reciprocal or complementary characteristics. Thus when the received signals represent colored scenes the auxiliary signal and the regular modulating signal will cooperate to produce a combined modulating signal which has a phase characteristic for which the off-white balance characteristic of the structure 28 compensates so that faithful color images may be reproduced. When the received signals represent monochrome portions of color television programs the auxiliary signal should interact with the regular modulating signal in a way such that black-and-white images untinged by any unwanted color are produced by the beam-intrecepting structure 28. Accordingly, the auxiliary signal is shifted in phase by the phase shifter 76 to the extent necessary to complement the white balance of the structure 28.

Fig. 1a shows another form of the invention that does not require an extra mixer and which may be used instead of the one shown in box 72 in the overall system of Fig. 1. In Fig. 1a only one new component, a phase shifter 76' shown in bold, is required since the mixer 68 now performs a double function. To insure that circuit 54 always has an indexing signal component in its output, the form shown in Fig. 1a guarantees that the mixer 68 will always be operative when the incoming signal contains burst. Thus, the 3.58 mc. output of oscillator 66 is applied to a phase shifter 76' whose output is connected to the input of mixer 68. Since the latter will have two input signals, one at 3.58 mc. and one at 9.58 mc., it will produce an output signal at 6 mc. having components derived from the indexing signal from mixer 62, the subcarrier from oscillator 66, and the chrominance components from channel 56. As in the form of Fig. 1, the phase of the auxiliary signal from shifter 76' will be chosen to complement the characteristics of the screen 28.

In the event that the received signal is not a color television signal but rather is a monochrome signal, no burst will appear therein. The circuits of Fig. 1 and Fig. 1a are so constructed that the mixer 64 does not produce an output signal if burst is not present in the received signal. This may be accomplished in several alternative ways, i.e., the oscillator 66 may be a ringing type of circuit which is energized periodically by burst applied thereto from the burst separator 57. The oscillator 66 in this case would be so constructed as to have a high "Q" and would produce a train of oscillations at 3.58 mc. which would last throughout several scanning intervals. In the absence of burst being applied thereto the oscillator 66 would not produce an input signal to the mixer 64 whereupon the latter would produce no output signal.

Alternatively the reference oscillator 66 may be of a conventional type comprising a continuous oscillator and a so-called "color killer" which detects the presence or absence of a signal on the grid of the oscillator and cuts off the mixer 64 in the absence thereof. Were the oscillator 66 to produce an output signal in the absence of burst its phase would not be constant since it is not locked. Consequently the phase of the auxiliary signal which would then be applied from the mixer 74 (Fig. 1) to the combining circuit 54 would not be constant and the image produced on the screen 28 would be subjected to visually disturbing variations in color tinges.

In either configuration, when the mixer 64 is inactivated the circuit 54 receives no modulating signal from the mixer 68 but only a luminance signal from the luminance channel 48 which it applies to the control grid 16. When this happens the width control circuit is inactivated during monochrome transmissions and the images produced by the scanning of the beam 17 of the structure 28 will be tinged to a barely perceptible degree since the structure 28 is constructed to compensate for the effect on the image colors introduced by the absent auxiliary signal.

Figure 3 shows still another form of the invention for use with the same kind of display device as the tube 10 of Fig. 1. This form of the invention depicts a so-called "off-set pilot carrier" system in which the indexing beam is modulated by a signal having a frequency equal to the sum of the frequency of the reference oscillatory wave and a given pilot carrier frequency as described in the copending U.S. patent application of G. A. Fedde, Serial No. 651,698, filed April 9, 1957. When the indexing beam scans the indexing strips, an indexing signal is produced which has a frequency equal to the sum of the frequency of the modulating signal and of the frequency of the signal generated by scanning the indexing strips. The indexing signal is then heterodyned with another signal resulting from the combination of the pilot carrier signal and the incoming chrominance components. The difference frequencies are then extracted and are used to modulate the intensity of the video beam 17. Parts of Fig. 3 which are identical with those of Fig. 1 are identically numbered and parts which are similar thereto are primed.

In this form of the invention the pilot carrier oscillator 59 operates at a frequency of approximately 40.5 mc. The output wave of the pilot carrier oscillator 59 is applied to a mixer 64' where it is heterodyned with a reference oscillatory wave having a frequency of 3.58 mc. supplied from the oscillator 66 (which is synchronized by the phase of the incoming burst applied thereto from the burst separator 57). The mixer 64' produces an output wave at 44 mc. which is applied to the control electrode 18 for modulating the indexing beam 19 thereby.

When the indexing beam 19 is swept across the indexing elements 38 there will be produced across the coupling capacitor 42 an indexing signal having a frequency of 50 mc. this indexing signal has phase variations which chiefly depend on variations in the rate at which the indexing strips 38 are scanned and is amplified to the desired level in the indexing amplifier 44. The amplified indexing signal is then applied to a mixer 69 to which a signal is also applied from mixer 61 which contains phase information indicative of the color of the scanned objects and having frequency ($\approx$44 mc.) resulting from addition of the frequencies of the chrominance components from channel 56 and of the frequency of the pilot carrier from oscillator 59. In the output of the mixer 69 a signal will appear which has difference frequencies of $\approx$6 mc. and a phase dependent upon the phase of the indexing signals, the phase of the reference wave, and the phase of the chrominance components. This signal is applied to the combining circuit 54 together with the luminance component from the luminance channel 48. The combining circuit 54 produces a $\approx$6 mc. beam-modulating output signal which contains luminance and chrominance information related to the instantaneous position of the beam. This $\approx$6 mc. modulating signal is then supplied to the control electrode 16 for modulating the video beam 17 therewith. The output signal of the combining circuit 54 also supplies indexing information to the width control circuit 70 in the same manner as in the system shown in Fig. 1.

It will be noted that in this system also, when the color transmission momentarily consists only of monochrome scenes, i.e., no chrominance components are present in the incoming signal (which contains burst), there will be no output signal from the mixer 61, and hence no output wave from the mixer 69. Thus the signal in the output of the combining circuit 54 cannot supply the circuit 70 with indexing information from amplifier 44 during this period, as a result of which the width of the picture can undergo sudden and visually disturbing changes in color-to-monochrome (and vice versa) transitions.

In accordance with this form of the present invention apparatus is provided which insures that indexing information is supplied to the width control circuit 70 via the combining circuit 54 whenever the incoming signals contain burst even when the chrominance components are missing. The approach taken here is to bypass some of the output signal of amplifier 44 around mixer 69 so that indexing information is always available to the combining circuit 54 whenever the incoming signal contains burst. Accordingly, as shown in the dashed-line rectangle 80 an extra mixer 84 is used to heterodyne the 50 mc. indexing signal from amplifier 44 with the output signal at 44 mc. from mixer 64' to produce a 6 megacycle difference frequency wave having phase characteristics which are related to the position of the beam as it scans the indexing strips 38 and related to the phase of the wave from mixer 64' as it is supplied via the shifter 82. Before mixing, the phase of the 44 mc. signal from the mixer 64' can be adjusted so that the off-white balance characteristic of the screen 28 compensates therefor with exactitude for the same reason as were specified in connection with the description of the foregoing forms of the invention.

Thus, when the received signals contain burst and chrominance components, the wave in the output of the mixer 84 will combine with the luminance signal and with the wave supplied to the combining circuit 54 from the mixer 69 in such a way that the tube 10 will produce a colored image which will be faithful to the original scene. When the received signals contain burst but represents monochrome scenes, the lack of chrominance components in the received signal disables the mixer 69. However, because of the operation of the apparatus in block 80, a signal containing indexing information reaches circuit 54, the width control circuit 70 is thereby rendered operative, and the reproduced images are rendered in black-and-white without undesired color tinges.

In the case of received signals which are not representative of scenes televised in color and therefore do not contain burst there will be no signal applied from the mixer 69 to the combining circuit 54 since there are no chrominance components applied to the mixer 61. There will also be no color corrective and indexing-information signal supplied from the apparatus shown within the block 80 inasmuch as the mixer 64' will not operate to produce an output signal since it lacks an input signal from the oscillator 66 in the absence of burst. The control circuit 70 will also be inoperative during monochrome signal transmissions since no indexing information is supplied to the combining circuit 54.

Thus the only signal which will be used to modulate the video beam 17 will be the luminance signal supplied to the combining circuit 54 from the luminance channel 48. Since the structure 28 is constructed to compensate for the presence of an auxiliary signal from the apparatus in rectangle 80, the tube produces, in the absence of such a signal, an image having a slightly perceptible color tinge, which tinge can be chosen to provide the most pleasing visual aspect.

Still other forms of the invention are possible which are based on the approach of insuring that the mixer 69 feeds indexing information to the combining circuit 54 whenever the incoming signal contains burst. This may be accomplished by insuring, in turn, that mixer 69 is always supplied with two input signals, one of which contains the indexing information.

One way this may be accomplished is shown in the form of the invention appearing in Fig. 4. In this alternative form a signal component containing indexing information is supplied to the circuit 54 whenever the received signal contains burst because the mixer 69 will always produce an output signal during color television transmissions. An auxiliary signal is derived by supplying to the mixer 69, via the phase shifter 82', the 44 mc. wave from the mixer 64' which contains burst and pilot carrier information. In mixer 69 the 44 mc. wave is mixed with the 50 mc. indexing signal from amplifier 44. Whenever the incoming signal contains chrominance components, the mixer 69 will produce a 6 mc. wave containing phase information of the indexing signal, phase information of the chrominance components, and phase information of the auxiliary signal (44 mc.) supplied via the phase shifter 82'. The phase of the latter signal can be adjusted so that the off-white balance characteristic of the screen structure 28 compensates therefor with exactitude. As a result the combining circuit 54 and, indirectly, the width control circuit 70, will always be supplied with indexing information and the beam will be modulated by a signal for which the structure 28 compensates so that the colors of the televised scene will be reproduced faithfully.

When the incoming signals contain burst but no chrominance components, the mixer 69 will be supplied only with the phase-shifted 44 mc. wave from the mixer 64' which permits the mixer 69 to supply a 6 mc. signal containing an indexing component from amplifier 44 to the combining circuit 54 and thence to the control circuit 70, enabling the latter to function. The reproduced image will be presented in untinged black-and-white tones and will not be subject to abrupt changes in picture width when transitions from color to monochrome, or vice versa, occur during programs televised in color.

Another way of insuring that two signals, one of which contains an indexing signal component, are supplied to mixer 69 whenever burst appears in the incoming signal is shown in the form of the invention illustrated in Fig. 5. A phase shifter 82" is connected between the reference oscillator 66 and the mixer 61 to supply an oscillatory wave at the burst frequency but with a predetermined phase, to mixer 61 so that it will provide an input signal to the mixer 69 whenever burst is present in the received signal. As in previous embodiments the phase of the auxiliary oscillatory wave is compensated by the off-white balance characteristic of the screen structure 28. Thus when the incoming signal contains burst and chrominance components, the wave from shifter 82" is combined in mixer 61 with the chrominance components from channel 56 and with the 40.5 mc. pilot carrier to produce an output signal at ≈44 mc. This output signal is applied to mixer 69 where it is heterodyned with the indexing signals from amplifier 44 producing a ≈6 mc. output wave which is supplied to circuit 54. Colored images will thereupon be reproduced which are faithful to the original and the width control circuit 70 will be operative.

When the received signals contain burst but no chrominance components the mixer 61 continues to receive the phase-shifted oscillatory wave at 3.58 mc. and continues to produce an output signal at 44 mc. which is applied to the mixer 69. This, in turn, enables the mixer 69 to supply an output wave at the writing frequency (which contains indexing information) to the combining circuit 54 thus enabling the control circuit 60 to operate. As was the case with the other forms of the invention previously discussed, since there is no generation of the auxiliary signal when the incoming signal lacks burst, the off-white color balance of the screen 28 will not be compensated thereby so that during monochrome transmissions the images will be slightly tinged. Thus in selecting the phase of the auxiliary signal and the white balance point of the screen 28, the monochrome image should also be given due consideration.

It will be understood that still other applications of the apparatus according to the diverse forms of my invention described herein will occur to those skilled in the art. Consequently, I desire the scope of this invention to be limited only by the following claims.

I claim:

1. A television system comprising a cathode ray tube wherein an electron beam is produced, a beam-intercepting structure which contains an image-forming portion which fluoresces in selected colors in response to the impingement of electrons thereupon, said image-forming portion being constructed to produce an off-white color when scanned by a constant amplitude electron beam, said structure also containing electron-sensitive elements for generating a beam-position indexing signal when electrons impinge thereupon, a source of a color television signal which may contain a component representative of the color information of a televised scene, means responsive only to the simultaneous application thereto of a component corresponding to said indexing signal and of said color-representative component for supplying a first signal to modulate said beam, said first signal having components corresponding respectively to the signals applied to said first signal supplying means, means for supplying a second signal to modulate said beam substantially only in response to the application thereto of said color television signal and a component corresponding to said indexing signal, said second signal comprising a component corresponding to said indexing signal, and a circuit responsive substantially only to the indexing signal component of said first and second modulating signals.

2. The television system according to claim 1 wherein said means for supplying said first modulating signal includes means for combining said indexing signal component with an oscillatory wave having a frequency equal to a subcarrier component of said color television signal and having a reference phase and also with said color-representative components, and wherein said means for supplying said second modulating signal includes means for combining a signal component having the same frequency as said oscillatory wave but a different predetermined phase with a signal having a component corresponding to said indexing signal.

3. A television system comprising a cathode ray tube wherein an electron beam is produced, a beam-intercepting structure which contains an image-forming portion comprising a plurality of elements which fluoresce in selected colors in response to the impingement of electrons thereupon, said image-forming portion being constructed to produce an off-white color when scanned by a constant amplitude electron beam, said structure also containing electron-sensitive elements for generating a beam-position indexing signal when electrons impinge thereupon, a source of a color television signal which contains a burst of an oscillatory subcarrier wave having a reference phase and which may also contain chrominance components representative of the color information of a televised scene, means to which said color television signal and said indexing signal are applied which is constructed to heterodyne said chrominance components with an oscillatory wave at said burst frequency and phase and with a component corresponding to said indexing signal thereby to produce a first signal for modulating said beam only when said applied color television signal contains said chrominance components, said first modulating signal having components corresponding to said chrominance components and a component corresponding to said indexing signal component, means to which said color television signal and said indexing signal are applied for producing a second signal for modulating said beam, said second modulating signal producing means including means for heterodyning an applied oscillatory wave having a component at said subcarrier frequency and at a predetermined phase with an applied component corresponding to said indexing signal, said second modulating signal having components corresponding to said applied components, and a control circuit responsive to the indexing signal component of said first and second modulating signals.

4. A television system comprising a cathode ray tube wherein first and second electron beams are produced, a beam-intercepting structure which contains an image-forming portion comprised of a plurality of phosphor elements which fluoresce in selected colors in response to the impingement of said first beam thereupon, said image-forming portion being constructed to produce white of a first predetermined color temperature when scanned by a constant amplitude electron beam, said structure also containing a plurality of electron-sensitive elements for generating, in response to the scanning of said second beam over them, a beam-position indexing signal, a source of a color television signal which contains a burst of a subcarrier wave having a reference phase and which may also contain chrominance components representative of the color information of a televised scene, means to which said color television signal and said indexing signal are applied for supplying a first signal to modulate said first beam only when said applied color television signal contains said chrominance components, said first modulating signal including a component corresponding to said applied indexing signal, means responsive to said color television signal and to a component corresponding to said indexing signal for supplying a second signal to modulate said first beam, said second modulating signal including a component corresponding to said indexing signal, and a circuit responsive only to the indexing signal component of said first and second modulating signals for controlling the width of the raster produced on said tube.

5. The television system according to claim 4 wherein said means for supplying said first modulating signal comprises means for combining said indexing signal with both a first oscillatory wave at said burst frequency and phase and with said chrominance components, and wherein said means for supplying said second modulating signal comprises means for combining a second oscillatory wave having the same frequency as said burst but a different phase with said component corresponding to said indexing signal.

6. The television system according to claim 5 with the further addition of means for modulating said second beam in response to a signal having a predetermined frequency, and wherein said means for supplying said first modulating signal additionally comprises means for additionally combining said indexing signal with a component corresponding to said signal of predetermined frequency.

7. The television system according to claim 4 further characterized in that when said color television signal is applied to said first and second modulating signal producing means, the modulation of said first beam by said first and second modulating signals and the characteristics of said image-forming portion cooperatively cause image elements representative of the whites of televised scenes to be reproduced as whites of a second predetermined color temperature.

8. A color television reproducing system which includes a cathode ray tube wherein first and second electron beams are produced, a beam-intercepting structure which contains an image-forming portion composed of a plurality of phosphor elements which fluoresce in selected colors in response to the impingement of said first beam thereupon, said image-forming portion being constructed to produce images having whites of a first predetermined color temperature when scanned by a beam of constant amplitude, said structure also containing a beam-indexing portion comprising a plurality of electron-sensitive elements for generating an indexing signal in response to the scanning of said second beam thereupon, a source of a color television signal which contains a burst of a subcarrier wave having a reference phase and which may also contain chrominance components representative of the color information of a televised scene, means for modulating said second beam in response to the application thereto of a signal having a predetermined single frequency, first means for heterodyning said indexing signal and said single frequency signal to produce a first heterodyne signal, second means for heterodyning said first heterodyne signal with an oscillatory wave having the same phase and frequency as said burst when said color television signal is received thereby to produce a second heterodyne signal, means for modulating said first beam, third means for heterodyning said second heterodyne signal with said chrominance components, said third means being constructed to supply a third heterodyne signal to said first-beam modulating means only when said color television signal contains said chrominance components, auxiliary means for insuring that a component corresponding to said second heterodyne signal is supplied to said first-beam modulating means whenever said second heterodyne signal is produced, and a circuit responsive to the indexing signal component of the signals applied to said first-beam modulating means from said third means and from said auxiliary means.

9. The color television reproducing system according to claim 8 wherein said auxiliary means comprises means for supplying to said third heterodyning means a component corresponding to an oscillatory wave at said burst frequency but having a predetermined phase, said last-named wave and the characteristics of said image-forming portion cooperating so that images having whites of a second predetermined color temperature are produced on said image-forming portion.

10. The color television reproducing system according to claim 8 wherein said auxiliary means comprises means for supplying a heterodyne product of said second heterodyne signal and a wave at said burst frequency but a predetermined phase to said first beam modulating means, said heterodyne product and the characteristics of said image-forming portion cooperating to cause image elements representative of the whites of televised scenes to be reproduced as whites of a second predetermined color temperature.

11. A television system comprising a cathode ray tube wherein first and second electron beams are produced, a beam-intercepting structure which contains an image-forming portion comprised of a plurality of phosphor elements which fluoresce in selected colors in response to the impingement of said first beam thereupon, said image-forming portion being constructed to produce white having a first predetermined color temperature when scanned by a constant amplitude electron beam, said structure also containing a plurality of electron-sensitive elements for generating, in response to the scanning of said second beam over them, a beam-position indexing signal, a source of a monochrome television signal and a color television signal, said color television signal always containing a burst of a subcarrier wave having a reference phase and a luminance component and sometimes containing chrominance components representative of the color information of a televised scene, means to which said color television signal and said indexing signal are applied for supplying a first signal to modulate said first beam only when said applied color television signal contains said chrominance components, said first modulating signal including a component corresponding to said applied indexing signal, means responsive to said color television signal and to said indexing signal for supplying a second signal to modulate said first beam, said second modulating signal including a component corresponding to said indexing signal, means for supplying said monochrome signal and said luminance component to modulate said first beam, and a circuit responsive to the indexing signal component of said first and second modulating signals.

12. A television system according to claim 11 wherein said means for supplying said first modulating signal comprises means for combining said indexing signal with both a first oscillatory wave having the same frequency and phase as said burst and with said chrominance components, and wherein said means for supplying said second modulating signal comprises means for combining a second oscillatory wave having the same frequency as said burst and a predetermined phase with said indexing signal.

13. A television system according to claim 12 further characterized in that when said second modulating signal is applied to modulate said first beam, said second signal and the characteristics of said image-forming portion cooperate to produce whites of a second predetermined color temperature.

14. A color television reproducing system which includes a cathode ray tube wherein first and second electron beams are produced; a beam-intercepting structure which contains an image-forming portion composed of a plurality of phosphor elements which fluoresce in selected colors in response to the impingement of said first beam thereupon, said image-forming portion being constructed to produce white of a first predetermined color temperature when scanned by a beam of constant amplitude, said structure also containing a beam-indexing portion comprising a plurality of electron-sensitive elements for generating an indexing signal in response to the scanning of said second beam thereupon; a source of a color television signal which contains a burst of a subcarrier wave having a reference phase and which may also contain chrominance components representative of color information of a televised scene; means for supplying the heterodyne product of a first oscillatory wave having the frequency and phase of said subcarrier wave and a second oscillatory wave having a predetermined frequency to modulate said second beam; means for modulating said first beam; first means for supplying a first signal to said last-named modulating means only in response to the application thereto of said chrominance components, said first supplying means comprising means for mixing said chrominance components with said second oscillatory wave thereby to produce a first heterodyne wave, and means for mixing said first heterodyne wave and said indexing signal thereby to produce said first signal; second means for supplying a second signal to said first beam modulating means, said second signal and the characteristics of said image-forming portion cooperating to produce images having whites of a second predetermined color temperature, said second signal supplying means comprising means for mixing said heterodyne product in predetermined phase relation with said indexing signal, and means responsive to the indexing signal component of said first and second modulating signals.

15. A color television reproducing system which includes a cathode ray tube wherein first and second electron beams are produced and deflected in unison over a beam-intercepting structure, said beam-intercepting structure including an image-forming portion composed of a plurality of phosphor elements which fluoresce in selected colors in response to the impingement of said first beam thereupon, said image-forming portion being constructed to produce white of a first predetermined color temperature when scanned by a beam of constant amplitude, said structure also containing a beam-indexing portion comprising a plurality of electron-sensitive elements for generating an indexing signal in response to the scanning of said second beam thereupon, a source of a monochrome television signal and a color television signal, said color television signal including a burst of a subcarrier wave having a reference phase, a luminance component, and which may also include chrominance components representative of color information in a televised scene, means for producing a first oscillatory wave having the same frequency and phase as said burst, means for producing a second oscillatory wave having a frequency appreciably higher than that of said burst, means for mixing said first and second oscillatory waves to produce a heterodyne signal for modulating said second beam, means for producing an output signal only when said chrominance components and said second oscillatory wave are applied thereto, means for modulating said first beam, means responsive to the application thereto of said output signal and said indexing signal for applying a first modulating signal to said first beam modulating means, means for applying said luminance component and said monochrome signal to said first beam modulating means, means for shifting the phase of said heterodyne signal, means responsive to said phase-shifted signal and to said indexing signal for applying a second modulating signal to said first beam modulating means, said second signal and the characteristics of said image-forming portion cooperating to produce images thereupon having whites of a second predetermined color temperature, and a circuit coupled to said first beam modulating means for modifying the scanning of said beams and constructed to be responsive to the indexing signal component of said first and second modulating signals.

16. The reproducing system according to claim 15 wherein said modifying circuit is constructed to regulate the width of the raster produced by the scanning of said first beam over said image-forming portion.

17. A color television reproducing system which includes a cathode ray tube wherein first and second electron beams are produced and deflected in unison over a beam-intercepting structure, said beam-intercepting structure including an image-forming portion composed of a plurality of phosphor elements which fluoresce in selected colors in response to the impingement of said first beam thereupon, said image-forming portion being constructed to produce white of a first predetermined color temperature when scanned by a beam of constant amplitude, said structure also containing a beam-indexing portion comprising a plurality of electron-sensitive elements for generating an indexing signal in response to the scanning of said second beam thereupon, a source of received signals comprising a monochrome television signal and a color television signal which includes a burst of a subcarrier wave having a reference phase, a luminance component, and which may also include chrominance components representative of color information in a televised scene, means for producing a first oscillatory wave in response to said burst which has the same frequency and phase as said burst, means for producing a second oscillatory wave having a frequency appreciably higher than that of said burst, means responsive to the application thereto of said first and second oscillatory waves for producing a signal for modulating said second beam, means for producing an output signal only in response to the application thereto of at least two signals, means for supplying said second oscillatory wave and said chrominance components, whenever they appear in said color television signals, to said output signal producing means, means for applying said first oscillatory wave in a predetermined phase to said last-named means whenever said color television signal is received, means responsive to said output signal and to said indexing signal for producing a signal for modulating said first beam, said modulating signal containing a component corresponding to said indexing signal, and means coupled to said last-named modulating signal producing means responsive to the indexing signal component of said modulating signal for controlling the scanning of said first beam.

18. A color television reproducing system which includes a cathode ray tube wherein first and second electron beams are produced and deflected in unison over a beam-intercepting structure, said beam-intercepting structure including an image-forming portion composed of a plurality of phosphor elements which fluoresce in selected colors in response to the impingement of said first beam thereupon, said image-forming portion being constructed to produce white of a first predetermined color temperature when scanned by a beam of constant amplitude, said structure also containing a beam-indexing portion comprising a plurality of electron-sensitive elements for generating an indexing signal in response to the scanning of said second beam thereupon, a source of received signals including a monochrome television signal and also including a color television signal which contains a burst of a subcarrier wave having a reference phase, a luminance component, said color television signal sometimes including chrominance components representative of color information in a televised scene, means for producing a first oscillatory wave in response to said burst which has the same frequency and phase as said burst, means for producing a second oscillatory wave having a frequency appreciably higher than that of said burst, means responsive to the application thereto of said first and second oscillatory waves for producing a signal for modulating said second beam, means responsive only to the application thereto of said second oscillatory wave and said chrominance components for producing an output wave, means for producing a signal for modulating said first beam only in response to the simultaneous application thereto of at least two signals, means for applying said indexing signal and said output wave to said last-named modulating means, means for continuously applying said signal for modulating said second beam to said means for modulating said first beam whenever said burst appears in said received signals, said second beam modulating signal and the characteristics of said image-forming portion thereupon cooperating to enable the production of white of a second predetermined color temperature when said first beam scans said image-forming portion, and means coupled to said means for modulating said first beam which is constructed and arranged to be responsive only to the indexing signal component of said signal for modulating said first beam.

19. A television system comprising a cathode ray tube wherein an electron beam is produced, a beam-intercepting structure which comprises a plurality of electron-sensitive elements which generate a beam-position indexing signal when electrons impinge thereupon, means for causing said beam to scan said elements, a source of a color television signal which contains a synchronizing signal indicative of a color transmission, said color television signal also sometimes containing components representative of the colors in a televised scene, an output circuit for modulating said beam in response to signals applied thereto, a control circuit coupled to said output circuit which is constructed to respond substantially only to the presence of a component corresponding to said indexing signal in said circuit, and means responsive to the synchronizing signal in said color television signal for insuring the application to said output circuit of a signal containing a component corresponding to said indexing signal, said insuring means and said control circuit being rendered inoperative in the absence of said color television signal.

20. The television system according to claim 19 wherein said insuring means includes means for supplying an auxiliary signal to said output circuit in response to said color television signal.

21. The television system according to claim 20 in which said beam-intercepting structure comprises a fluorescent screen constructed to have a selected white-balance characteristic, said screen and said auxiliary signal having complementary characteristics thereby to produce images on said screen having predetermined resultant color attributes.

22. A television system comprising a cathode ray tube wherein an electron beam is produced; a beam-intercepting structure which comprises a plurality of electron-sensitive elements which generate a beam-position indexing signal when electrons impinge thereupon, said beam-intercepting structure also including a plurality of image-forming elements; means for causing said beam to scan said elements; a source of a television signal which contains a synchronizing signal indicative of a mode of transmission of selected intelligence in a televised scene, said television signal sometimes also containing components representative of said selected intelligence; first means responsive to said television signal when it contains said intelligence-representative components for modulating said beam by a component corresponding to said indexing signal, a wave having the same frequency and phase as said synchronizing signal, said intelligence-representative components, and an auxiliary signal; second means responsive to said television signal when it does not contain said intelligence-representative components for modulating said beam by a component corresponding to said indexing signal and said auxiliary signal; and control means coupled to said first and second modulating means which is actuated only in response to said indexing signal.

23. The television system according to claim 22 wherein said image-forming elements are constructed to exhibit a predetermined white-balance and wherein said auxiliary signal is selected to complement said white-balance characteristic.

24. A television system comprising a cathode ray tube wherein an electron beam is produced, a beam-intercepting structure which comprises a plurality of electron-sensitive elements which generate a beam-position indexing signal when electrons impinge thereupon, said structure also comprising an image-forming fluorescent screen, means for causing said beam to scan said elements, a source of first and second television signals, said first signal corresponding to the transmission of intelligence representative of scenes televised in color, said first television signal sometimes having chrominance components therein, said second signal corresponding to the transmission of intelligence representative of scenes televised in monochrome, an output circuit for modulating said beam in response to signals applied thereto, a control circuit constructed to operate only in response to the presence of a component corresponding to said indexing signal in said output circuit, first means for applying to said output circuit an auxiliary signal having a component corresponding to said indexing signal in response to said first television signal, and second means responsive to said first television signal only when it contains said chrominance components for applying said chrominance components and a component corresponding to said indexing signal to said output circuit, said control circuit thereby being enabled to operate whenever said first television signal occurs.

25. The television system according to claim 24 in which said fluorescent screen is constructed to have a selected white-balance characteristic which complements the effect of said auxiliary signal on the colors of the image produced by the beam modulated thereby.

26. The television system according to claim 25 wherein said first and second applying means are rendered inoperative in response to said second television signal, said system additionally having third means responsive to said second signal for modulating said beam only by a signal representing only the luminance of said scenes televised in monochrome.

27. A television receiver comprising a cathode ray tube wherein an electron beam is produced, a beam-intercepting structure comprising a plurality of phosphor strips emissive of selected colors and arranged to extend in a first direction, said structure also including a plurality of beam-position indexing strips arranged in a predetermined spatial relation to selected ones of said phosphor elements and constructed to respond to the impingement of electrons thereupon, means for deflecting said beam over said structure in a plurality of scanning paths which extend generally in a second direction transverse to said first direction, said beam thereupon causing the production of an indexing signal by its traversal of said indexing strips, a source of television signals representing, in a first mode of transmission, scenes televised in color and representing, in a second mode of transmission, scenes televised in monochrome, said television signals in said first mode always containing a burst of a reference wave and sometimes containing chrominance components primarily representative of the color information of televised scenes, an output amplifying circuit for modulating the intensity of said deflected beam in response to the application of signals thereto, a control circuit coupled to said output modulating circuit and being constructed to respond substantially only to the presence of a component corresponding to said indexing signal therein, means responsive only to said television signal in said first mode when it contains said chrominance components for supplying to said output circuit components respectively corresponding to said indexing signal, said chrominance components and an auxiliary signal component, means responsive only to said television signal in said first mode when it does not contain said chrominance components for supplying to said output circuit a component corresponding to said indexing signal and said auxiliary signal component, and means responsive to said television signal in said second mode for preventing the supplying of any of said chrominance, indexing, and auxiliary signals to said output circuit.

28. The receiver according to claim 27 with the addition of means responsive only to said television signal in said second mode for supplying only said monochrome-representative signal to said output circuit.

No references cited.